United States Patent
Leoutsarakos et al.

(10) Patent No.: US 9,722,799 B2
(45) Date of Patent: *Aug. 1, 2017

(54) DISTRIBUTED SYSTEM FOR MULTI-FUNCTION SECURE VERIFIABLE SIGNER AUTHENTICATION

(71) Applicant: Topaz Systems, Inc., Simi Valley, CA (US)

(72) Inventors: Nikos Leoutsarakos, Montreal (CA); Paul Chronopoulos, Laval (CA)

(73) Assignee: Topaz Systems, Inc., Moorpark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,767

(22) Filed: Jan. 21, 2015

(65) Prior Publication Data

US 2015/0188714 A1   Jul. 2, 2015

Related U.S. Application Data

(63) Continuation of application No. 12/751,885, filed on Mar. 31, 2010, now Pat. No. 8,959,353.

(60) Provisional application No. 61/165,014, filed on Mar. 31, 2009.

(51) Int. Cl.
*G06F 21/00* (2013.01)
*H04L 9/32* (2006.01)
*H04L 29/06* (2006.01)
*H04L 9/14* (2006.01)

(52) U.S. Cl.
CPC .............. *H04L 9/3255* (2013.01); *H04L 9/14* (2013.01); *H04L 9/3247* (2013.01); *H04L 9/3263* (2013.01); *H04L 9/3268* (2013.01); *H04L 63/0823* (2013.01); *H04L 63/126* (2013.01); *H04L 2209/24* (2013.01); *H04L 2209/72* (2013.01); *H04L 2209/80* (2013.01)

(58) Field of Classification Search
None
See application file for complete search history.

(56) References Cited

U.S. PATENT DOCUMENTS

| 7,380,708 | B1* | 6/2008 | Kiliccote | G06F 21/6209 |
| | | | | 235/380 |
| 7,581,109 | B2* | 8/2009 | De Boursetty | H04L 9/3255 |
| | | | | 713/180 |
| 2001/0047406 | A1* | 11/2001 | Araujo | H04L 29/06 |
| | | | | 709/223 |

(Continued)

OTHER PUBLICATIONS

USPTO Notice of Allowance—Examiner-Initiated Interview Summary issued in related (parent) U.S. Appl. No. 12/751,885, dated Oct. 17, 2014, 10 pages.

(Continued)

*Primary Examiner* — Benjamin Lanier
(74) *Attorney, Agent, or Firm* — Ivan M. Posey; Jeffrey G. Sheldon; Leech Tishman Fuscaldo & Lampl

(57) ABSTRACT

A distributed multi-function secure system for verifiable signer authentication having a personal private key stored in a secure storage of a mobile device where the mobile device connects to a fragmented distributed signing engine by a secure protocol and is issued a signer certificate from a circle of trust certificate server to securely electronically sign documents.

6 Claims, 7 Drawing Sheets

(56) References Cited

U.S. PATENT DOCUMENTS

| | | | |
|---|---|---|---|
| 2003/0200437 A1* | 10/2003 | Oishi | H04L 9/3013 713/175 |
| 2004/0053601 A1* | 3/2004 | Frank | G01S 5/0252 455/411 |
| 2004/0139325 A1* | 7/2004 | De Boursetty | H04L 9/3255 713/176 |
| 2005/0021964 A1 | 1/2005 | Bhatnagar et al. | |
| 2005/0097316 A1* | 5/2005 | Kim | H04L 9/3255 713/163 |
| 2007/0244817 A1* | 10/2007 | Dolivo | G06Q 10/087 705/50 |
| 2008/0168539 A1 | 7/2008 | Stein | |
| 2009/0044019 A1 | 2/2009 | Lee et al. | |
| 2009/0198618 A1* | 8/2009 | Chan | G06Q 20/02 705/66 |
| 2009/0249191 A1 | 10/2009 | Leoutsarakos et al. | |

OTHER PUBLICATIONS

USPTO, Non-Final Office Action issued in related (parent) U.S. Appl. No. 12/751,885, dated May 6, 2014, 12 pages.
USPTO, Final Office Action issued in related (parent) U.S. Appl. No. 12/751,885, dated Apr. 9, 2013, 15 pages.
USPTO, Non-Final Office Action issued in related (parent) U.S. Appl. No. 12/751,885, dated Nov. 13, 2012, 16 pages.

\* cited by examiner

DISTRIBUTED SYSTEM FOR MULTI-FUNCTION SECURE VERIFIABLE SIGNER AUTHENTICATION

CROSS-REFERENCE TO RELATED APPLICATION

This application claims priority to and the benefit of U.S. Provisional Application No. 61/165,014, filed on Mar. 31, 2009, in the United States Patent and Trademark Office.

FIELD

The field of this intervention relates to signature pads and more particularly, a distributed system for multi-function secure verifiable signer authentication that is secure, highly available and inexpensive.

BACKGROUND

Signing is a human activity that has evolved over time from a rigid, behind closed doors activity, to an online Web based experience. Barriers of space and time, i.e., all signers must be present at the same place and at the same time, have been broken to reflect our new way of interacting with one another in a fast paced global village. Even what we are signing is no longer restricted to paper documents.

The majority of the tools on the market today do not allow signers to digitally sign their documents. Instead, the tools themselves sign the documents on behalf of the signers. In practice, the tools use a single private key that belongs to the owner of the tool and sign all documents with it. The signer provides only his signature image. In the case of "signing as a service" where the signing engine resides somewhere on the Web and signers upload their documents and sign them online, not only all documents are signed using the private key of the Web site but signers are not even allowed to provide their signature images. Clearly these signing tools have lost their objectivity and instead of being a third party to the transaction they have become a participant.

Referring now to FIG. 1, there is shown a diagram a prior art location specific secure signature authentication system 100 currently used. As can be seen, traditional signing engines 100 require that all the signing activities take place in the same hardware. The document to be signed, the certificates to sign with, the clock to provide the timestamp, and the location info (i.e., hardware info) 104 are all present in the same hardware configuration and there is no need for any data to travel on networks. A traditional signing engine performs the three standard digital signature operations in the same physical hardware: the signing server. All documents are signed by the "server certificate" 106 and all digital signatures produced 108 are identical. The signer's credentials are ignored and never used.

As can be seen, the signature pads that are presently used, will not be able to fulfill these requirements.

Therefore, there is a need for a distributed system for multi-function secure verifiable signer authentication that is secure, highly available and inexpensive.

SUMMARY

The present invention meets this need by providing a system designed to satisfy the deficiencies in the current art namely: mobility, signer authentication, agility, always on, online, and security for must provide signer credentials for authentication, secure access to the Web, secure transmission of data, secure local storage, and its own credentials for device authentication. The invention comprises a distributed system for multi-function secure verifiable signer authentication having a) a personal private key; b) a mobile device for storing the personal private key, where the mobile device further comprises a secure local storage; c) a fragmented distributed signing engine communicatively coupled to the mobile device; d) a secure protocol communicatively coupled to both the mobile device and the fragmented signing engine; e) a circle of trust certificate server communicatively coupled to the mobile device; and f) a signer certificate communicatively coupled to the mobile device, the circle of trust certificate server and the fragmented distributed signing engine.

Additionally, the personal private key is a private key issued by the circle of trust certificate server. The signer certificate comprises the document, a time, a place and signer credentials in a single encrypted structure. The mobile device is configured for secure wireless Internet access and is selected from the group consisting of a cellular phone, a computer, a wireless PDA, a smartcard, an ATM keypad, a magstripe reader and a smartcard reader. The fragmented distributed signing engine is configured to hash and prepare a document for authenticated digital signing. The mobile device is configured to sign with the personal private key of the signer and send the resulting digital signature back to the server to be embedded into the document. The protocol is configured to securely transmit at least part of a complete securely signed document to the fragmented distributed signing engine, from the fragmented distributed signing engine or both to and from the fragmented distributed signing engine. The protocol is also configured to securely transmit at least part of a complete securely signed document to the mobile device, from the mobile device or both to and from the mobile device. Also, the protocol means for secure transmission between the mobile device and the fragmented distributed signing engine is distributed. The circle of trust certificate comprises a public key and information about the user and the signer certificate is unique to each signer to each circle of trust certificate.

There is also provided a method for a distributed system for multi-function secure verifiable signer authentication comprising the steps of: a) providing the system of claim 1; b) joining a circle of trust; c) obtaining a personal private key; d) providing a document to be securely signed from a fragmented distributed signing engine; e) signing the provided document using the personal private key; f) recombining the provided document and the personal private key by the fragmented signing engine; and g) transmitting the recombined document to a destination. The step of joining a circle of trust further comprises protocol means for securely transmitting information between the mobile device and the fragmented distributed signing engine. The step of obtaining a personal private key is performed by the circle of trust server using a user's profile information and a unique device identification. The circle of trust server combines the user's profile information and the unique device identification into a unique user reference number for a particular circle of trust. The user's profile information, unique device identification and unique user reference number are stored on the circle of trust server for securely verifying the mobile device. The step of recombining the provided document includes transmitting a challenge and receiving a response from the mobile device. The challenge and response use the private key of the device and no server certificates.

A method for a protocol for a distributed system for multi-function secure verifiable signer authentication is also provided comprising the steps of: a) initialization of the mobile device; b) enrolling a mobile device to a secure server; and b) authenticating the mobile device to the secure server. The step of initialization further comprises the steps of: a) acquiring an application comprising the protocol; b) starting the application; c) generating a public key and a private key based on PKI technology and the user's information; d) storing the public key and the private key in the mobile device; and e) generating a temporary unique hash from the user's name and a unique device identification. The step of enrolling further comprises the steps of: a) providing a profile to the circle of trust server; b) generating a unique user reference number from the provided information; c) displaying the unique user reference number; d) selecting a circle of trust server from a displayed list on the mobile device; e) entering the unique user reference number; f) registering the mobile device with the circle of trust server; g) verifying the signer certificate; h) combining the unique user reference number and the unique device identification and the public key; i) transmitting data bidirectionally with the circle of trust server using the combination of step h); j) decrypting at the circle of trust server the data; k) storing on the circle of trust server the unique user reference number and the unique device identification in the profile; l) producing a signer certificate; m) transmitting the signer certificate to the mobile device; and n) storing the signer certificate in the local secure storage on the mobile device. The unique user reference number is transmitted to the user by email. The step of authenticating further comprises the steps of: a) executing an application comprising the protocol; b) downloading a circle of trust server list; c) displaying the list on the mobile device; d) selecting a circle of trust server from the displayed list; e) connecting to the selected circle of trust server; f) verifying a signer certificate stored in the mobile device; g) retrieving the profile associated with the signer certificate; h) generating a challenge to the mobile device using the public key stored in the profile; i) transmitting the challenge to the mobile device; j) decrypting on the mobile device the challenge using the private key stored in the local secure storage; k) combining the challenge and the unique device identification; l) generating a hash from the combination in step k); m) encrypting the hash with the public key received from the circle of trust server to produce a response to the challenge; n) send the response to the circle of trust server; o) decrypting the response using a server private key to extract the response and the unique device identification; p) verifying the challenge and the response; q) providing a secure channel between the mobile device and the circle of trust server if the challenge and response are verified; and r) transmitting signature data.

A method is provided for obtaining an electronic signature by a) receiving at a document server a request for a document to be signed; b) providing the requested document for receipt by a mobile device; and c) receiving the signed document from the mobile device with a signer certificate, the signer certificate being unique for the mobile device and the document, the certificate having been provided to the mobile device by an authentication server physically separate from the document server. In one embodiment, second server is remote from the first server.

A method if provided for authenticating an electronic signature for a document comprising a) storing personal private key for use with a unique mobile device and personal information associated with a user of the mobile device; b) receiving a request to certify the user at an authentication server, the request including the personal private key, a unique identifier for the mobile device, and information relating to the document, the information relating to the document and the document having been provided by a document server separate from the authentication server; and c) providing to the mobile device a signer certificate for the certified user, the signer certificate being unique for the mobile device and the document, the signer certificate being readable by the document server. In one embodiment, the personal private key provided is for use with the unique mobile device.

BRIEF DESCRIPTION OF THE DRAWINGS

These and other features, aspects and advantages of the present invention will become better understood with regard to the following description, appended claims, and accompanying figure where:

DETAILED DESCRIPTION

Figure 1:
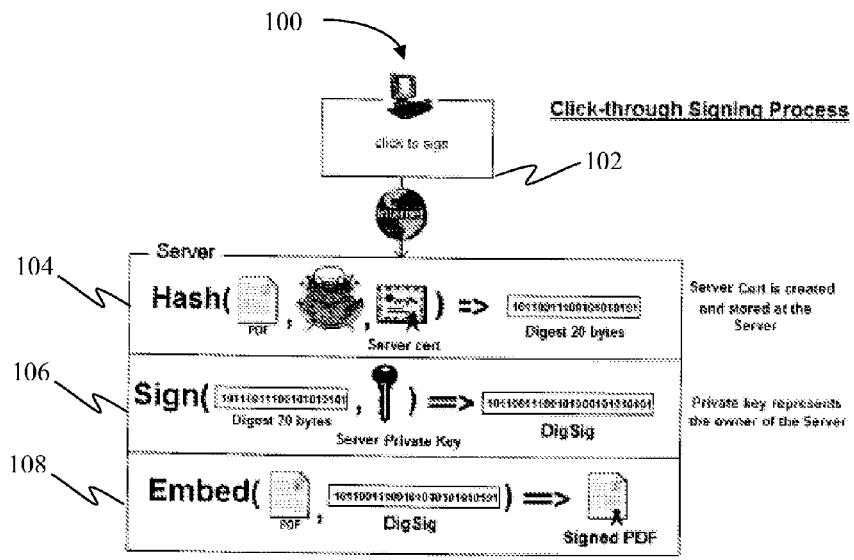
FIG. 1 is a diagram of a prior art location specific secure signature authentication system.

The present invention solves the problems that stem from the fact that a single private key is being used to sign all documents. The present invention allows each signer to use their own private key to sign. This implies local signing, i.e., signing that must take place at the client site and not at the server site. Consequently, the signing engine must be able to function partially on the server to hash and prepare the document, and partially on the client to sign with the private key of the signer and send the resulting digital signature back to the server to embed it into the document. This novel fragmented signing engine and the new protocol used to secure the exchanges between server and client in one embodiment of the present invention. This distributed signing engine provides mobility and allows a user to sign anywhere.

As a user exists in the physical world and the user's certificate represents him in the cyber world. Using the secure protocol presented herein provides user/signer authentication that can be added naturally by using the existing PKI infrastructure of the client and of the server to provide mutual authentication. The present invention has the potential to become an extension of the signer, a trusted signing token, and allow real globalization of authenticated digital signing.

The platform described herein is a software platform for smart phones, iPhones, PDAs, tablet-PCs etc. The platform will be able to run on Windows XP and VISTA, Mac OS, Linux and Blackberry (Java) as well as other future signing pads. The platform of the present invention takes advantage of the PKI capabilities of the underlying operating system to communicate securely with a server.

Being in the palm of a user's hand will allow signers who possess a device with the present invention to be called (or invited) to sign securely and safely, regardless of their physical or cyber location. No longer will the signer's physical presence be needed in order to obtain his signature (both digital and squiggle).

Mobility (freedom from geographical restrictions), agility (freedom from form factor), always on (freedom from wires, online (freedom to choose type of signature), and security (freedom from fraud), are some of the requirements of the future signer that are met using the present invention.

Additionally, signers are not the only ones changing. Governments and institutions are also changing their requirements to include globalization, signer identification, i.e., authentication without physical presence, an emphasis on greener technology, i.e., paperless office, cost cutting by optimizing work flow, leverage partnerships by optimizing cooperation with third parties and security from malicious or accidental incidents.

The present invention answers these needs and more. The present invention can comprise a computer platform with its own operating system, services and applications and most importantly the ability to accommodate new signing, authentication and signer identification applications as they are needed.

The only way to secure the future of signature pads is to avoid predicting it and instead create a limitless sign anywhere software/hardware platform.

Methods, systems and devices that implement the embodiments of various features of the system will now be described with reference to the drawings. The drawings and the associated descriptions are provided to illustrate embodiments of the system and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention.

The term "vPad" (Virtual Pad) refers to electronic signature pads that will be based on a single common platform/architecture as disclosed in this disclosure.

The term "document" refers to any item that may need to be securely authorized, such as, for example, electronic bill payments and legal documents among others.

The term "fragmented signing engine" refers to a secure computer system that does not contain all the security information necessary to completely sign a document.

The term "circle of trust" refers to one or more fragmented signing engines that have established a trustworthy relationship with a user.

Figure 2:
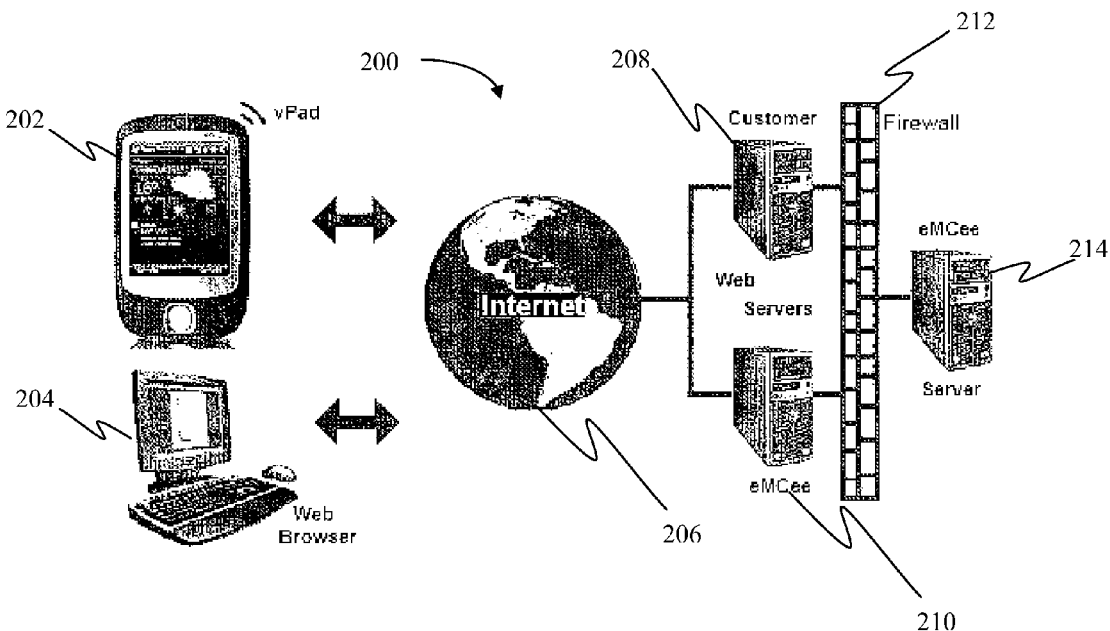
FIG. 2 is a diagram of a distributed system for multi-function secure verifiable signer authentication according to one embodiment of the present invention.

Referring now to FIG. 2, there is shown a diagram of a distributed system for multi-function secure verifiable signer authentication 200 according to one embodiment of the present invention. According to one embodiment, a mobile device 202 or a computer 204 can be used to access the Internet 206 and access web servers 208 and 210. Once the mobile device 202 or the computer 204 have entered the site and been authenticated to pass through a firewall 212 and access the secure server 214, the document signing process can begin.

Figure 3:
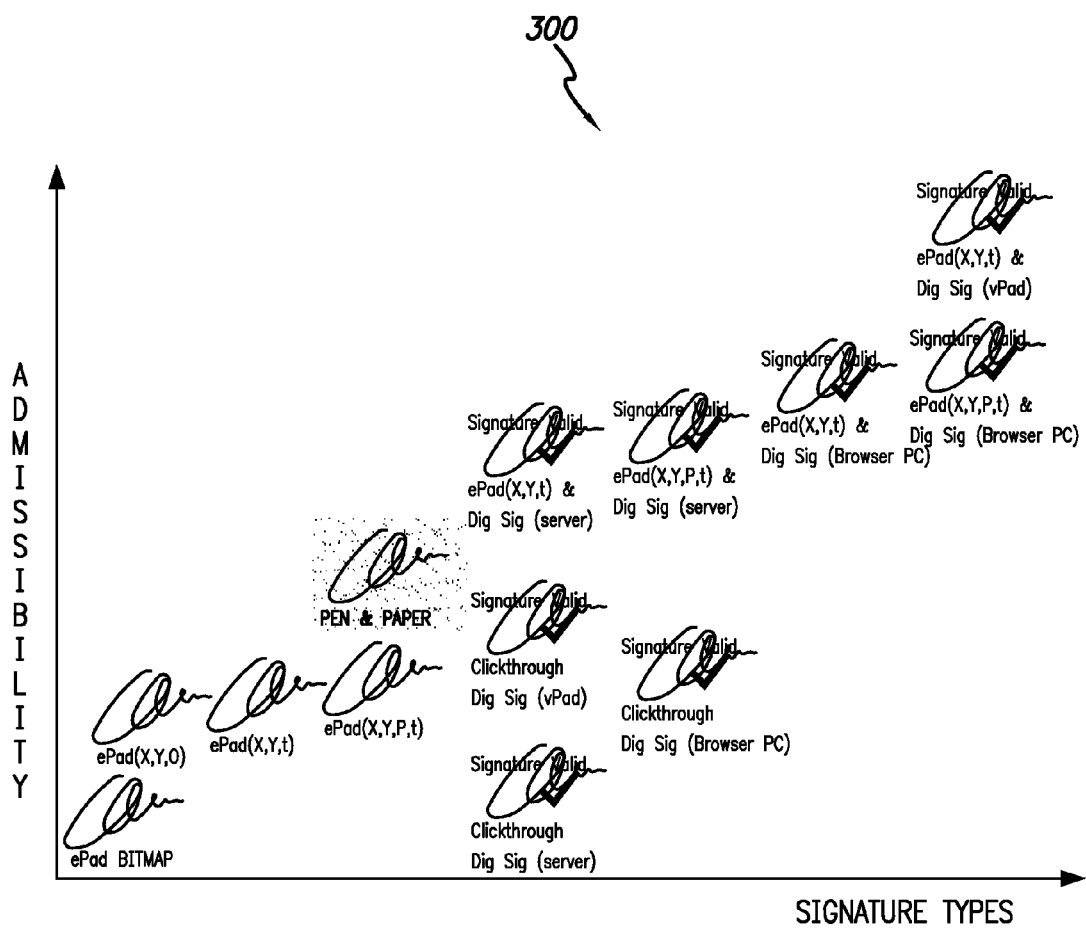
FIG. 3 is a chart of the strength of admissibility of various signature authentication techniques.

Referring now to FIG. 3, there is shown a chart 300 of the strength of admissibility of various signature authentication techniques. A traditional signing engine (see FIG. 1) performs the three standard digital signature operations in the same physical hardware on the signing server. All documents are signed by the "server certificate" and all digital signatures produced are identical. The actual signer's credentials are ignored and never used. The admissibility of this type of digital signatures in the court of law is low because people are witnessing the signing activity instead of being part of the signing process. The (1) time, (2) place, (3) hardware used and (4) document that was signed is captured, but the signed documents do not contain any information about the actual signer. This is the reason why digital signatures that are generated online today are the least trustworthy.

On the opposite end of the chart is a vPad digital signature the has both the strongest signature type and the greatest admissibility.

Finally, a word on security. IntegriSign Emcee Mobile provides the highest level of security for digital signing. As it can be seen in FIG. 2, while a signature image or a click-through online digital signature provides the least forensic value, a signature produced by a vPad provides the most forensic value. In other words, in the wide spectrum of signature admissibility in the court of law vPad signatures rank at the top of the scale. This is because a signer will have a hard time convincing a judge that he did not use his own mobile device to create the signature image and that he did not allow his own private key to be used to create the digital signature.

Figure 4:
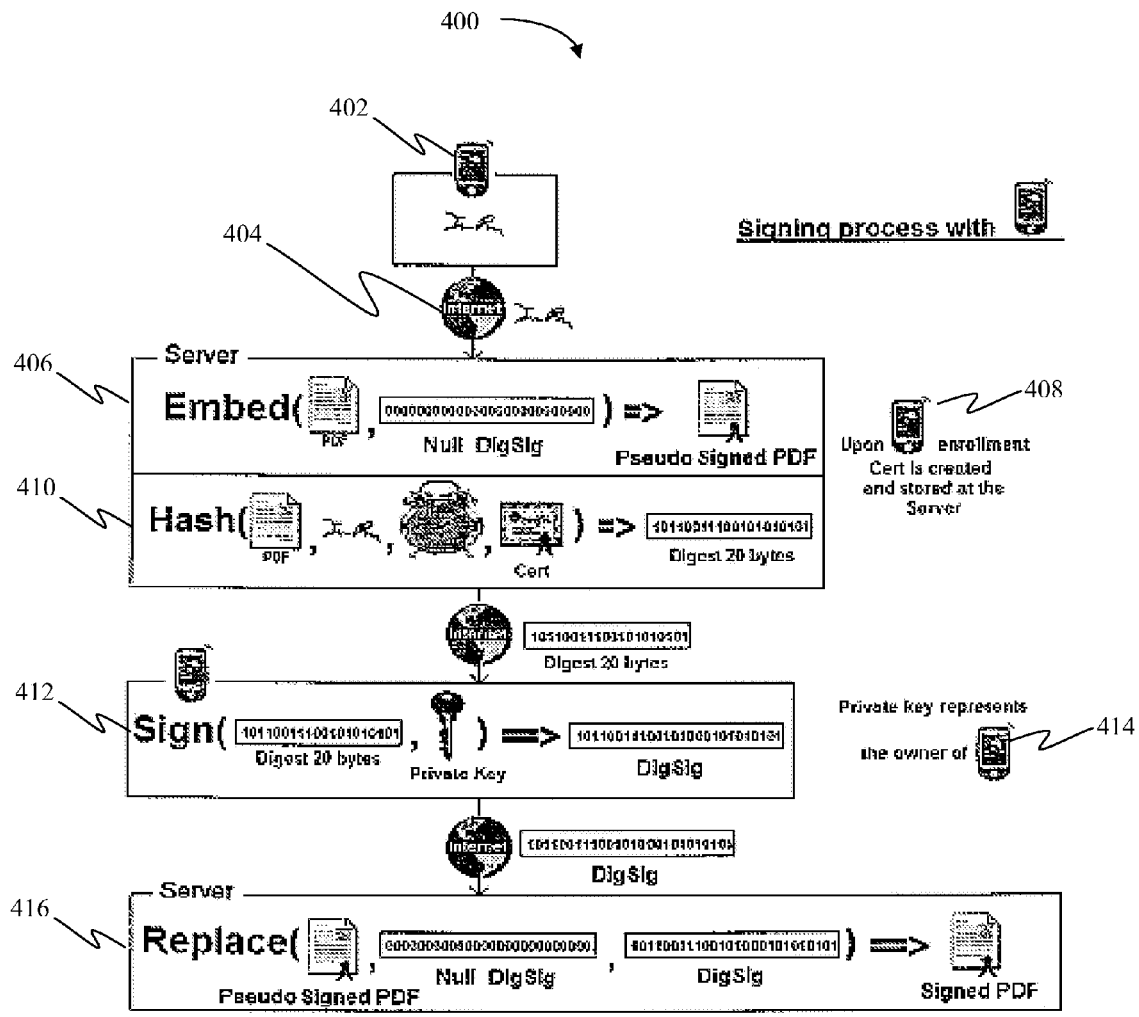
FIG. 4 is a detailed diagram of the system of FIG. 2 according to one embodiment.

Referring now to FIG. 4, there is shown a detailed diagram 400 of the system of FIG. 2 according to one embodiment. A mobile device 402 connects via the Internet 404 to a fragmented signing engine 406 that is part of the user's circle of trust. The user enrolls the mobile device 408 and a key pair is created and stored on the fragmented signing engine 406. The fragmented signing engine 406 generates a pseudo signed document that the user selects for signing and embeds a null digital signature in the document. After the user has enrolled 408, a signers certificate is generated using a hash of the document, user's identification, such as, for example, a stored digitized copy of the user's signature, a time and a place 410. In a preferred embodiment, the hash is a twenty byte digest hash. The hash is sent via the Internet 404 using a secure protocol to a circle of trust server. The circle of trust server is in the user's circle of trust and comprises one or more private keys 414 that represent the owner of the mobile device. The circle of trust server generates a signer's certificate 412 and transmits the signer's certificate 412 to the fragmented signing engine 406. The fragmented signing engine 406 then replaces the pseudo signature with the authenticated digital signature in the document 416 and then transmits the signed, authenticated document to a destination for processing.

The digital signatures produced are all different and only one per signer. This type of digital signature binds the document, the time, the place and the signer credentials in a single encrypted structure, thus providing the highest level of non-repudiation. The "server certificate" is not used as in the past (see FIG. 1).

A distributed signing engine, according to one embodiment, is provided that signs documents using "signer certificates". The digital signatures of the signer certificates produced are all different as they should be, one per signer. This type of digital signature binds the document, the time, the place and the signer's credentials in a single encrypted structure, thus providing the highest level of non-repudiation. The "server certificate" is not used.

The distributed engine proposed requires that sensitive information be communicated between the server and the mobile device. The security protocol outlined below is an integral part of the distributed engine.

The protocol in its present form is a preferred but not exclusive embodiment. The need for secure communications for the distributed engine may be satisfied by other future variations of this protocol.

Figure 5:
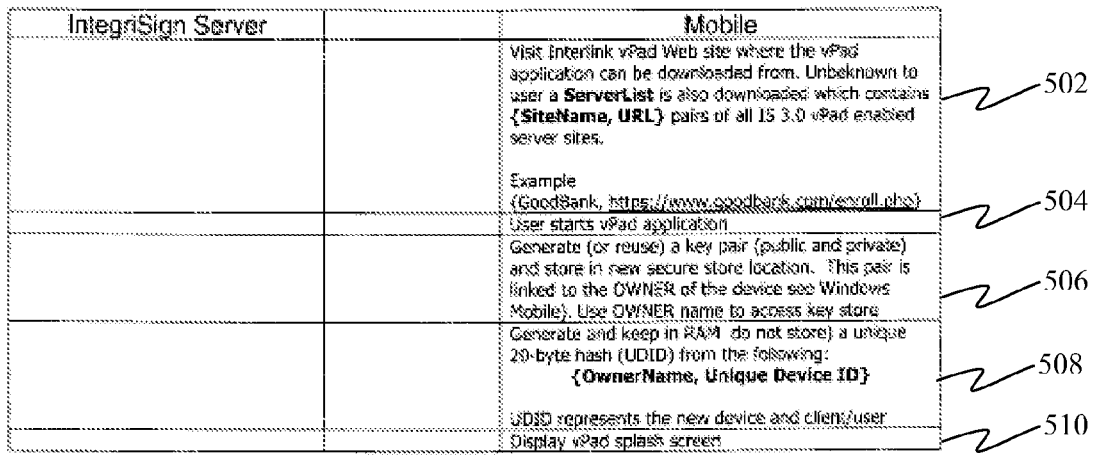
FIG. 5 is a chart of a protocol method for initialization of the system of FIG. 2 according to one embodiment.

Referring now to FIG. 5 there is shown a chart of a protocol method for initialization 500 of the system of FIG. 2 according to one embodiment. First, a user visits a Web site where an application can be downloaded and installed 502 on a mobile device. A circle of trust server list is also downloaded comprising {SiteName, URL} pairs for each of the circle of trust servers in the list. Next, the user starts the application 504. Then, a key pair, public and private, are generated and stored 506 in a new secure storage location on the mobile device. The key pair is linked to the user who is the owner of the device. Next, a temporary unique hash is generated 508 from the owner's name and a unique device identification that is embedded in the mobile device {OwnerName, Unique Device ID}. This unique device identification represents the user. Finally, the application starts and displays an interactive screen to the user 510.

Figure 6:
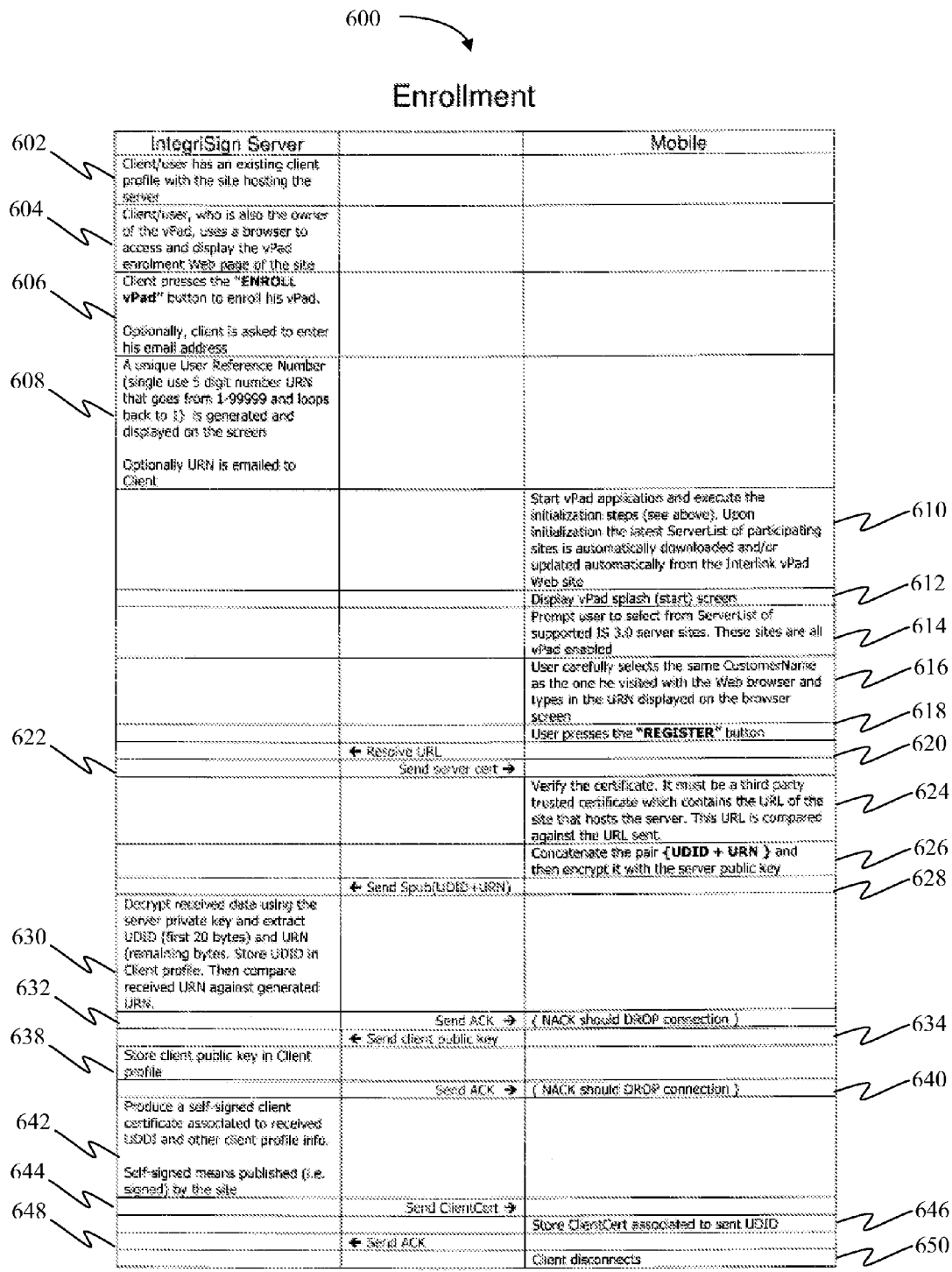
FIG. 6 is a chart of a protocol method for enrollment in the system of FIG. 2 according to one embodiment.

FIG. 6 is a chart of a protocol method for enrollment 600 in the system of FIG. 2 according to one embodiment. First a user establishes a client profile or has an existing client profile on the site hosting the server 602. Next, the user, who is also the owner of the vPad, uses a browser to access and display the vPad enrollment Web page of the site 604. Then, the user can press an "ENROLL" button on the vPad to enroll 606. Optionally, client is asked to enter his email address for use in secure communications. Next, a unique user reference number (URN) is generated and displayed on the screen 608. Optionally, the URN can be a single use 5 digit number URN that goes from 1-99999 and loops back to 1. Optionally URN is emailed to the user. Then, the vPad application is started and the initialization steps (see above) are performed. Next, upon successful initialization of the vPad, the latest ServerList of participating sites is automatically downloaded and/or updated automatically from the Web site 610. Then, a splash (start) screen is displayed 612. Next, the user is prompted to select a server from the ServerList 610. The servers listed in the ServerList 610 are all vPad enabled 614. Then, the user carefully selects the same CustomerName as the one he visited with the Web browser and types in the URN displayed on the browser screen 616. Next, the user presses the "REGISTER" button to register the user's device with the selected server 618. Then, the URL is resolved 620. Next, a server certificate is sent 622. Then, the certificate sent comprises the URL of the site that hosts the server. The certificate sent must be a third party trusted certificate. Next, the URL is compared against the URL sent 624. Then, the UDID and the URN are concatenated {UDID+URN} and then encrypted with a server public key 626 forming an Spub. Next, the Spub{UDID+URN} is sent to the server 628. Then, the sent Spub data is received and decrypted using a server private key and the UDID and the URN are extracted. Preferably, the extracted UDID comprises a first twenty (20) bytes of the received data and the URN comprises the remaining bytes of the received data. Next, the UDID is stored in a client profile. Then, the received URN is compared against the generated URN 630. Next, an ACK 632 is sent to the mobile device indicating that the previous step has been received. Then, the mobile device sends a client public key to the server 634. Next, the client public key 636 is stored in the client profile on the server. Then, an ACK indicating that the public key has been stored is sent to the mobile device 638. Next, a self-signed client certificate associated to receive UDID and other client profile info is produced 640. Then, a self-signed means is published (i.e., signed) by the site 642. Next, a ClientCert is sent to the mobile device 644. Then, the ClientCert associated to the sent UDID is stored in a local secure storage on the mobile device 646. Next, an ACK that the ClientCert step above has been completed is sent to the site 648. Finally, the user disconnects 650 from the site.

Figure 7:
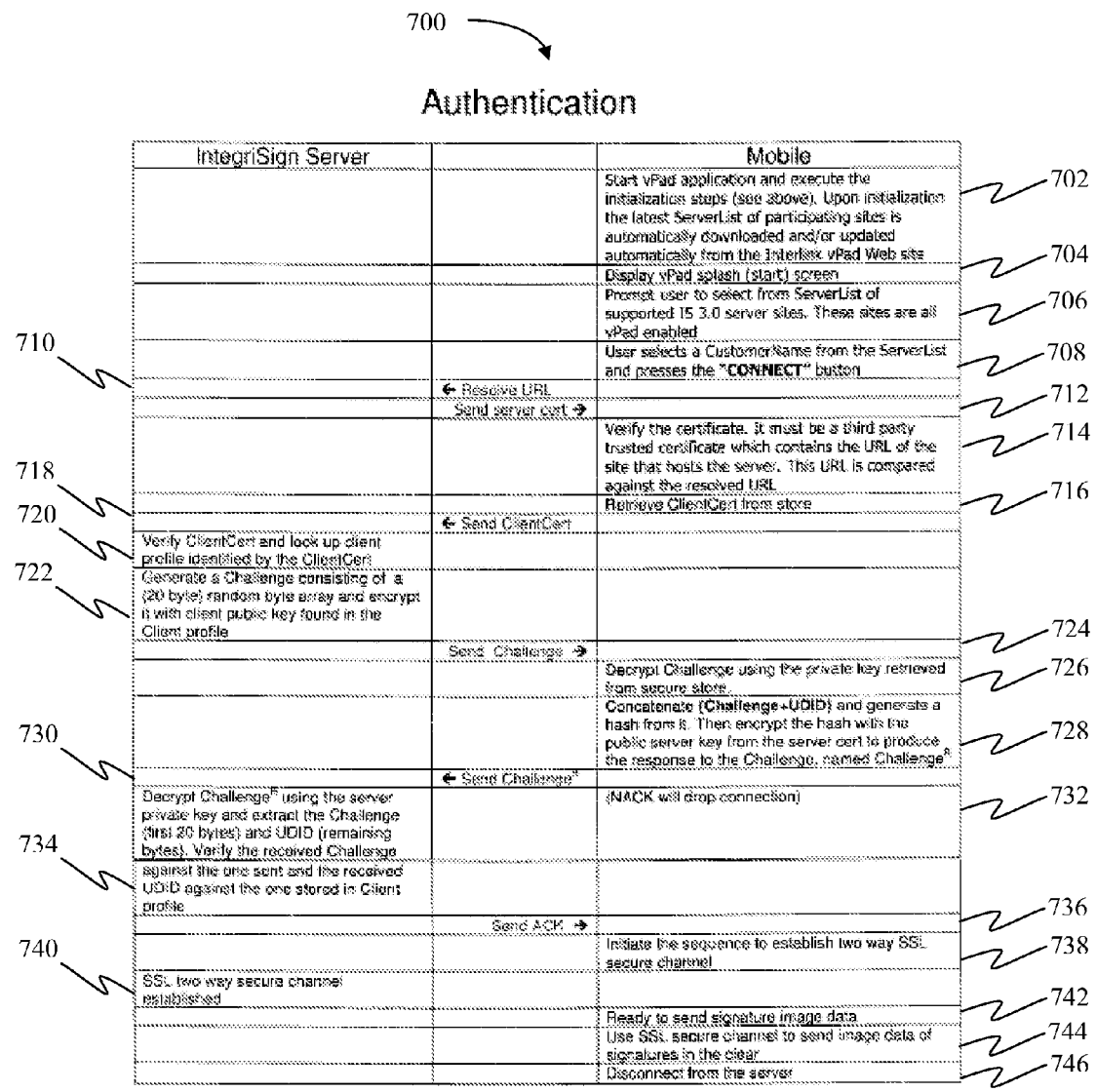
FIG. 7 is a chart of a protocol method for authentication for the system of FIG. 2 according to one embodiment.

FIG. 7 is a chart of a protocol method for authentication 700 for the system of FIG. 2 according to one embodiment. First, the vPad is initialized. Then, a copy of the latest ServerList of participating sites is automatically downloaded and/or updated automatically from the Web site 702. Next, a splash (start) screen is displayed 704. Then, the user is prompted to select a server from the ServerList of supported sites. Optionally, all of the listed servers and sites are vPad enabled 706. Next, the user selects a CustomerName from the ServerList and presses a "CONNECT" button 708. Then, the URL of the server is resolved 710. Next, the server cert is sent 712. Then, the certificate is verified 720. The certificate must be a third party trusted certificate which contains the URL of the site that hosts the server. Next, the URL is compared against the resolved URL 714. Then, a ClientCert is retrieved from a local secure storage 716. Next, the ClientCert is sent 718. Then, the ClientCert is verified and a client profile identified by the ClientCert is retrieved on the server 720. Next, a Challenge is generated 722. In a preferred embodiment, the challenge comprises a 20 byte random byte array and is encrypted with a client public key found in the Client profile 722. Then, the challenge is sent 724. Next, the challenge is decrypted using the private key retrieved from the local secure storage 726. Then, the challenge and a unique device identification (Challenge+UDID) are concatenated and a hash is generated from the concatenation. Next, the hash with the public server key from the server cert is encrypted to produce the response to the challenge 728. Then the response to the challenge is sent 730. Next, the response to the challenge is decrypted using the server private key and the response to the challenge is extracted 732. In a preferred embodiment, the response to the challenge comprises the first 20 bytes and the UDID comprises the remaining bytes. Then, the response to the challenge is verified against the challenge sent and the received UDID against the one stored in the Client profile 734. If response to the challenge is verified, then an acknowledgement (ACK) is sent 736. Next, a sequence to establish two way SSL secure channel is initiated 738. Then, an SSL two way secure channel is established 740. Next, the server prepares to send signature image data 742. Then, image data of a user's signature is sent in the clear using the secure SSL channel 744. Finally, the device disconnects from the server 746.

Digital signatures were invented in 1976 and the RSA algorithm was first published in 1978. These mathematical inventions are based on the notion of a key pair: a private key and a public key. The private key owned by a signer is used to sign and the public key known to everyone is used to verify. While simple to understand, it is very difficult to make good practice. Beginning in 1978 companies started looking for ways to create, store and manage these key-pairs in a secure and user friendly manner. To date no clear solution has been discovered or implemented.

The two opposing forces of security and user friendliness have plagued the industry since its inception. Several products have failed in the market place because Public-private Key Infrastructure (PKI) was too expensive and/or too difficult to understand, install and manage. Without PKI there can be no digital signatures and PKI is too expensive and unusable by non-technical people.

The present invention proposes a new concept called "Circles of Trust" to counter both the high cost and usability problems of PKI. The high cost of PKI comes from the fact that certificates are bought and sold on the market and prices range from four dollars to thousands of dollars per certificate annually. Companies like VeriSign® charge for the service of verifying and asserting the identity of the owner of a certificate. The idea being, that a VeriSign® certificate for example, would be acceptable by anyone and by any company on earth and nobody would ever doubt this certificate. However, early on people naturally started to doubt certificates, and when processes of how owner identities are checked were placed under the microscope, companies like VeriSign® and others stopped being the panacea that the industry thought they would be. Reacting to this market revolt, companies that had already bought certificates created monstrous hardware and software infrastructures and hired expensive specialists to protect their investment and make PKI work for them. Other companies decided to dismantle PKI from their organization too late, after having already spent millions of dollars trying to make PKI work.

The present invention will generate and use private-public key pairs and certificates, "Circles of trust" was born out of the observation that trust is a complex human feeling that never travels far. In other words, an individual has a small group of people that he trusts: a mechanic to fix his car, a dentist, a lawyer, a priest etc., usually half a dozen to a dozen people. The individual next to him has his own circle of trust which, most often than not, includes different people. The same holds true for a university for example. Students go through a rigorous program to become a professional and for as long as they stay within the country their diploma is recognized automatically. However, if they decide to immigrate to another country, they sometimes find out to their surprise that their diploma is not trusted and often asked to pass tests for example. The circle of trust for a university is the country in which it resides. Trust never travels far.

Initial attempts to use PKI certificates failed because we ignored this very strong human need to keep our circles of trust small. As humans, we were not ready then, and we are not ready now to accept that all seven billion of us would be given and use VeriSign® certificates. We know today that a globally acceptable certificate is a Utopia not a practicality.

Figure 8:
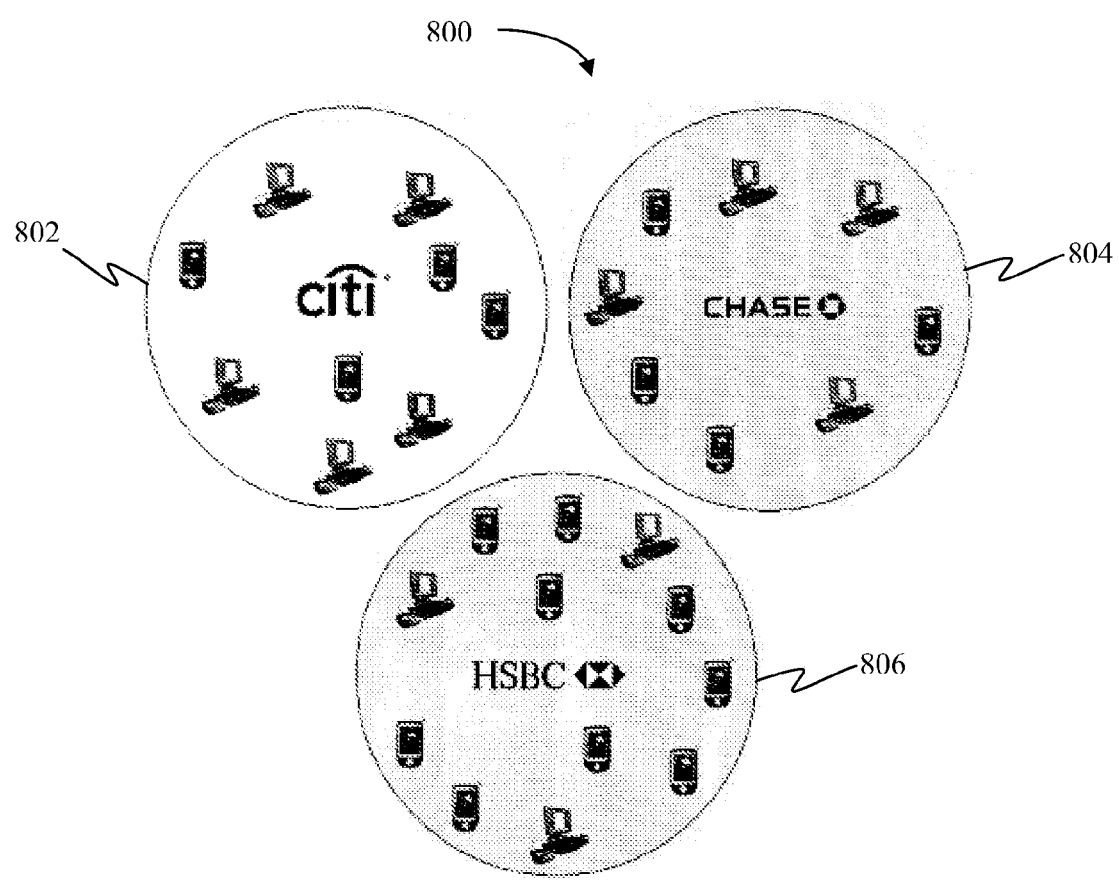
FIG. 8 is a diagram representing circles of trust useful for the system of FIG. 2.

The present invention provides that each server is in the center of its own "signing circle of trust" controlling which traditional browsers, devices, mobile devices and other "signing clients" are allowed in the circle by granting them a certificate (FIG. 8). The certificate, the public key of the signing client and information about the signing client are bundled together and signed by the private key of the server. Both the public key of the signing client and the information about the signing client are public information. By signing this public information with its private key, the server attests that it has checked and verified that this public information is correct and that from now on it is willing to cooperate with this signing client. In practice, the server does not actually check the owner information. It relies on customer authentication systems that have examined the owner and have provide a user profile to the server. The certificate generated is always associated to a particular user profile known to the server. Once a certificate is issued, it is stored at the server and then sent to the signing client to be stored there as well. Whenever a signing client wishes from then on to cooperate with the server, the signing client needs to provide this certificate to the server. The certificate is a unique and secure membership token into the circle of trust.

The cost of purchasing certificates is eliminated since each server is a certificate server as well, generating certificates for free. These certificates are mathematically identical and equally secure to certificates that cost thousands of dollars. The certificates produced by the servers can be identical to VeriSign® certificates. Also, both signing clients and servers generate private and public keys for free, on their own, and they do not need to purchase them.

The circle of trust is a closed system between the server and its members, the entire process can be fully automated. The user can log in at a traditional browser PC equipped with an electronic signature pad, such as, for example, an ePad, or a tablet PC among others. The user/owner is not aware of the complex exchanges that take place between their client devices and the circle of trust server. Once the devices are enrolled, i.e., they become members in a circle of trust, PKI literally disappears from the user lever but continues in the background.

Certificates issued by a circle of trust server can control which signing clients have access to its circle of trust. If a signing client wishes to belong to two circles of trust in the present implementation it will have to obtain two certificates one from each circle of trust server. This inconvenience can be alleviated if the two Emcee servers could create an inter-trust relation between them that would allow one to accept the certificates of the other.

FIG. 8 is a diagram representing circles of trust 800 useful for the system of FIG. 2. A user can have a first circle of trust 802, a second circle of trust 804, a third circle of trust 806, etc. Each circle of trust 802-806 comprises separate certificate and key pairs for the user.

Advantages of the Present Invention

Traditional signing engines require that all the signing activities take place in the same hardware. The document to be signed, the certificates to sign with, the clock to provide timestamp, and the location info (i.e., hardware info) are all present in the same hardware configuration and there is no need for any data to travel on networks.

The Web changed everything. Obtaining and verifying digital signatures is no longer what it used to be. "Physical presence" has been replaced by "signer authentication" and "Signature image" has been replaced by a "watermark and some info".

In this new signing environment a signature touch pad has a new role to play. It is no longer sufficient to simply capture a good-looking image of the signer's squiggle. A signing device must provide signer credentials for authentication, secure access to the Web, secure transmission of data, secure local storage, and its own credentials for device authentication.

It is envisioned that a pad that is partially a cellular phone, partially a wireless PDA, partially a smartcard, partially an ATM keypad, partially a magstripe reader, partially a smartcard reader, partially a user token ID, etc. will meet this need. The difficulty is that such a device must also fit in the palm of a hand, be easy to use and maintain and cost about the same if not less than today's signature pads.

In addition, a signature pad must become an extension of the signing tools in the future, by providing a significant part of the new signing experience. A pad equipped with security hardware will become the trusted credential in the new signing environment. In a way, a pad is in an excellent position to become the signer. Online signing servers on the Web will trust such pads and they will rely on them to capture and provide signer ID and signer intent remotely.

One can easily see that this new functionality is not a replacement to existing features. The signing device of the future must continue to capture high quality handwritten signatures, must continue to display color images and must continue to measure bio-behavior (e.g. pressure, direction, velocity, etc.).

So a pad will be asked to do more. It will also be asked to change form. Migration from the desktop to the palm of a hand first, and from a single-function device to a multi-function secure signer ID second, are the two main market thrusts that will dictate the unavoidable change to today's pad.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. A method for a distributed system for multi-function secure verifiable signer authentication, the method comprising the steps of:
 a) providing a storage medium comprising instructions executable on a processor to provide:
  a personal private key;
  a mobile device for storing the personal private key, where the mobile device further comprises a secure local storage;
  a fragmented distributed signing engine communicatively coupled to the mobile device;
  a secure protocol communicatively coupled to both the mobile device and the fragmented signing engine;
  a circle of trust certificate server communicatively coupled to the mobile device; and
  a signer certificate communicatively coupled to the mobile device, the circle of trust certificate server and the fragmented distributed signing engine;
 b) joining a circle of trust;
 c) obtaining a personal private key;
 d) providing a document to be securely signed from a fragmented distributed signing engine;
 e) signing the provided document using the personal private key;
 f) combining the provided document and the personal private key by the fragmented signing engine; and
 g) transmitting the combined document to a destination;
where the step of joining further comprises protocol means for securely transmitting information between the mobile device and the fragmented distributed signing engine; and where the step of obtaining a personal private key is performed by the circle of trust server using a user's profile information and a unique device identification;
where the circle of trust server combines the user's profile information and the unique device identification into a unique user reference number for a particular circle of trust.

2. The method of claim 1, where the user's profile information, unique device identification and unique user reference number are stored on the circle of trust server for securely verifying the mobile device.

3. A method for a protocol for a distributed system for multi-function secure verifiable signer authentication, the method comprising the steps of:
 a) initializing a mobile device;
 b) enrolling the mobile device to a secure server; and
 c) authenticating the mobile device to the secure server;
where the step of initialization further comprises the steps of:
 i) acquiring an application comprising the protocol;
 ii) starting the application;
 iii) generating a public key and a private key based on PKI technology and the user's information;
 iv) storing the public key and the private key in the mobile device; and
 v) generating a temporary unique hash from the user's name and a unique device identification; and where the step of enrolling further comprises the steps of:
  i) providing a profile to the circle of trust server;
  ii) generating a unique user reference number from the provided information;
  iii) displaying the unique user reference number;
  iv) selecting a circle of trust server from a displayed list on the mobile device;
  v) entering the unique user reference number;
  vi) registering the mobile device with the circle of trust server;
  vii) verifying the signer certificate;
  viii) combining the unique user reference number and the unique device identification and the public key;
  viv) transmitting data bidirectionally with the circle of trust server using the combination of step viii);
  x) decrypting at the circle of trust server the data;
  xi) storing on the circle of trust server the unique user reference number and the unique device identification in the profile;
  xii) producing a signer certificate;
  xiii) transmitting the signer certificate to the mobile device; and
  xiv) storing the signer certificate in the local secure storage on the mobile device.

4. The method of claim 3, where the unique user reference number is transmitted to the user by email.

5. The method of claim 3, where the step of authenticating further comprises the steps of:
  a) executing an application comprising the protocol;
  b) downloading a circle of trust server list;
  c) displaying the list on the mobile device;
  d) selecting a circle of trust server from the displayed list;
  e) connecting to the selected circle of trust server;
  f) verifying a signer certificate stored in the mobile device;
  g) retrieving the profile associated with the signer certificate;
  h) generating a challenge to the mobile device using the public key stored in the profile;
  i) transmitting the challenge to the mobile device;
  j) decrypting on the mobile device the challenge using the private key stored in the local secure storage;
  k) combining the challenge and the unique device identification;
  l) generating a hash from the combination in step k);
  m) encrypting the hash with the public key received from the circle of trust server to produce a response to the challenge;
  n) send the response to the circle of trust server;
  o) decrypting the response using a server private key to extract the response and the unique device identification;
  p) verifying the challenge and the response;
  q) providing a secure channel between the mobile device and the circle of trust server if the challenge and response are verified; and
  r) transmitting signature data.

6. A method of authenticating an electronic signature for a document comprising the steps of:
  providing instructions executable on a processor configured to perform the following steps:
    a) storing personal private key for use with a unique mobile device and personal information associated with a user of the mobile device;
    b) receiving a request to certify the user at an authentication server, the request including the personal private key, a unique identifier for the mobile device, and information relating to the document, the information relating to the document and the document having been provided by a document server separate from the authentication server; and
    c) providing to the mobile device a signer certificate for the certified user, the signer certificate being unique for the mobile device and the document, the signer certificate being readable by the document server.

* * * * *